A. HARCUM.
GLASS MELTING POT.
No. 175,081. Patented March 21, 1876.
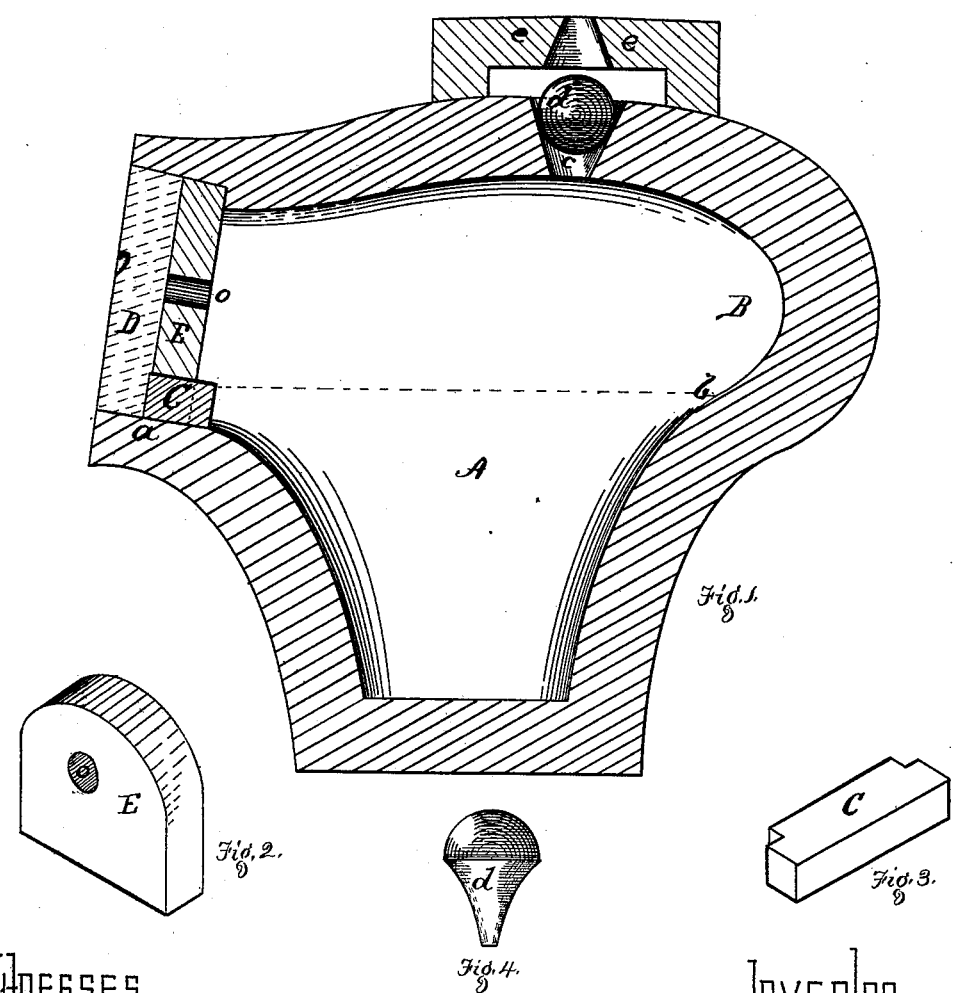

UNITED STATES PATENT OFFICE.

ANDREW HARCUM, OF PITTSBURG, PENNSYLVANIA, ASSIGNOR TO HIMSELF AND PETER KUNZLER, OF SAME PLACE.

IMPROVEMENT IN GLASS-MELTING POTS.

Specification forming part of Letters Patent No. 175,081, dated March 21, 1876; application filed February 7, 1876.

*To all whom it may concern:*

Be it known that I, ANDREW HARCUM, of Pittsburg, in the county of Allegheny and State of Pennsylvania, have invented a new and useful Improvement in Glass-Melting Pots; and I do hereby declare the following to be a full, clear, and exact description thereof, reference being had to the accompanying drawing, forming part of this specification, in which—

Figure 1 is a vertical section. Fig. 2 is a perspective view of the inner stopper. Fig. 3 is a perspective view of an auxiliary "pot." Fig. 4 is a view of a stem-valve, which may be employed in lieu of the ball-valve, Fig. 1.

Like letters refer to like parts wherever they occur.

My invention relates to the construction of "melting-pots" for the manufacture of glass; and it consists, first, in forming the pot with a bulge or projecting portion, which performs the function of a magazine, and insures a full pot of glass, without the necessity of removing the stopper after the batch has been put in the pot; second, in providing the pot with a valve, which permits the escape of the gas without admitting air, and prevents blowing out of the stoppers; third, in an auxiliary "pot," which enables the pot to be worked with a larger batch, thus avoiding any excess of cordy glass.

Glass-pots ordinarily constructed require two fillings before a sufficient quantity of glass is formed to be worked to advantage. The usual manner is to fill the pot, then close it, and permit the first batch to melt and sink in the pot, after which the pot is opened and a second batch thrown in, which results in cooling the pot and throwing back the process from twelve to fourteen hours. The object of the first part of my invention is to save this loss of time.

In melting down the batch it frequently occurs that the stoppers are blown out by the gas generated or set free from the batch, permitting the batch to cool, and delaying the melting process. The object of the second part of my invention is to provide an escape for the gases, and regulate the pressure in the pot.

In working glass, the smoothest and best glass is found at the top, while toward the bottom of the pot the glass becomes cordy, and does not work to advantage; but this cordy glass does not increase in quantity in proportion to the size of the batch, and is probably due to the subsequent fillings of the pot, and increases in proportion to the number of fillings. The object of the third part of the invention is, therefore, to increase the capacity of the pot for molten glass without increasing its depth or altering its construction.

In examining the glass from time to time, to determine whether it is smooth enough to be worked, the stoppers commonly used have to be taken down, which permits the pot to cool and retards the melting. The object of the fourth part of the invention is to preserve the temperature of the pot, and permit the inspection of its contents without the removal of the inner stopper.

I will now proceed to describe my invention with reference to the drawing, so that others skilled in the art to which it pertains may apply the same.

A indicates a glass-pot, the lower portion of which and the pot $a$ are of the usual or any approved form and size. B is an extension or heel, the greatest projection of which is either on a line with or slightly above the pot, $a$, and slopes thence to the bottom of the pot, forming an inclined surface, $b$. In the crown or top of the pot is a beveled opening, $c$, for the reception of a ball or stem valve, $d$, and directly over the opening $c$ is a cap, $e$, which limits the movement of the valve and prevents its displacement. C is an auxiliary or detachable "pot," of suitable form to fit the mouth of the pot, but not quite as wide as the pot $a$. This auxiliary pot is laid in position, as shown, when the capacity of the pot is to be increased, and is removed when the molten glass has been worked down, so as to facilitate gathering from the bottom of the pot. D is the usual outer stopper. The inner stopper E I form with an opening, $o$, by means of which the contents of the pot may be inspected without removing said inner stopper.

The pot may be set in the arch in the usual manner.

The batch is thrown into the pot until the pot is filled, when the stoppers are put in place. As the melting proceeds that portion of the batch held by the magazine or extension will be fed down the sloping side of the pot, and, if the pot is properly proportioned, will insure a full pot of glass without a second filling. If the pressure of gas in the pot becomes excessive, the valve will be lifted, and the gas permitted to escape. At the close of work, or when it is desirable to replenish a pot in which the glass is low, the auxiliary pot C is inserted in the mouth of the pot, and the pot filled and closed, as before specified.

Among the advantages of the present invention are saving of fuel, time, and increased capacity of pots for working glass.

Having thus described my invention, what I claim, and desire to secure by Letters Patent, is—

1. A glass-melting pot provided with an extension or magazine, substantially as and for the purpose specified.

2. In combination with a glass-melting pot, the valve for permitting the escape of the gases formed during the melting of the batch.

3. In combination with a glass-melting pot, an auxiliary pot, substantially as and for the purpose specified.

In testimony whereof I, the said ANDREW HARCUM, have hereunto set my hand.

ANDREW HARCUM.

Witnesses:
B. Z. GROVE, Sr.,
JAMES I. KAY.